United States Patent
Yashiro (10) Patent No.: US 8,376,601 B2
(45) Date of Patent: Feb. 19, 2013

(54) BACKLIGHT UNIT AND DISPLAY UNIT

(75) Inventor: Yuji Yashiro, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 236 days.

(21) Appl. No.: 12/739,092

(22) PCT Filed: May 20, 2008

(86) PCT No.: PCT/JP2008/059239
§ 371 (c)(1),
(2), (4) Date: Apr. 21, 2010

(87) PCT Pub. No.: WO2009/054160
PCT Pub. Date: Apr. 30, 2009

(65) Prior Publication Data
US 2010/0246210 A1    Sep. 30, 2010

(30) Foreign Application Priority Data
Oct. 23, 2007    (JP) .................................. 2007-275574

(51) Int. Cl.
*F21V 7/04* (2006.01)
(52) U.S. Cl. ........ 362/606; 362/607; 362/610; 362/620; 362/626
(58) Field of Classification Search .................. 362/606, 362/607, 610, 616, 620, 612, 613
See application file for complete search history.

(56) References Cited

U.S. PATENT DOCUMENTS 7,628,527 B2 * 12/2009 Kim et al. ..................... 362/621
2001/0017773 A1 * 8/2001 Suzuki et al. .................. 362/26
2004/0130880 A1    7/2004 Min et al.
2007/0019439 A1 * 1/2007 Yu et al. ........................ 362/621
2009/0190068 A1    7/2009 Kawamura

FOREIGN PATENT DOCUMENTS

| CN | 2802544 Y | 8/2006 |
| JP | 2000-249837 | 9/2000 |
| JP | 2005-129242 | 5/2005 |
| JP | 2005-135844 | 5/2005 |
| JP | 2006-324169 | 11/2006 |
| JP | 2007-005091 | 1/2007 |

OTHER PUBLICATIONS

English Translation of Chinese Office Action in Chinese Application No. 200880108359.3, dated Aug. 15, 2011.
International Search Report for PCT/JP2008/059239, mailed Aug. 19, 2008.

* cited by examiner

*Primary Examiner* — Evan Dzierzynski
(74) *Attorney, Agent, or Firm* — Nixon & Vanderhye P.C.

(57) ABSTRACT

A backlight unit (3) provided with a LED package (light source) (11) and a light guide plate (14) includes a light-emitting portion (12) that is provided on the light guide plate side of the LED package (11) so as to be opposed to an incident surface (14a) of the light guide plate (14) and outputs light from the LED package (11) toward the light guide plate (14). A dimension on the incident surface side of the light-emitting portion (12) in a thickness direction of the light guide plate (14) is not more than a dimension at the incident surface (14a) of the light guide plate (14) in its thickness direction, and the light-emitting portion (12) uses a two-dimensional photonic crystal (12a).

12 Claims, 6 Drawing Sheets

BACKLIGHT UNIT AND DISPLAY UNIT

This application is the U.S. national phase of International Application No. PCT/JP2008/059239, filed 20 May 2008, which designated the U.S. and claims priority to Japanese Patent Application No. 2007-275574, filed 23 Oct. 2007, the entire contents of each of which are hereby incorporated by reference.

TECHNICAL FIELD

The present invention relates to a backlight unit, in particular, an edge-light type backlight unit provided with a light guide plate, and a display unit using the same.

BACKGROUND ART

In recent years, for example, a liquid crystal display unit has been used widely in liquid crystal televisions, monitors, mobile phones, and the like as a flat panel display having features such as a smaller thickness and a lighter weight than a conventional cathode ray tube. Such a liquid crystal display unit includes an illumination unit (backlight unit) that emits light, and a liquid crystal panel that displays a desired image by serving as a shutter with respect to light from a light source provided in the backlight unit.

The backlight unit as described above is classified roughly into a direct type and an edge-light type depending on the arrangement of the light source with respect to the liquid crystal panel. For example, a liquid crystal display unit for use in mobile equipment such as a mobile phone, a notebook PC, and a PDA generally adopts the edge-light type, which achieves a smaller thickness more easily than the direct type. More specifically, the edge-light type backlight unit includes the light source on a side of the liquid crystal panel for achieving a smaller thickness, and uses a light guide plate that has a light-emitting surface opposed to a non-display surface of the liquid crystal panel so as to irradiate the liquid crystal panel with light from the light source.

Further, a linear light source composed of a cold-cathode tube or a hot-cathode tube has been used as the light source of the backlight unit. However, such a cold-cathode tube or the like contains mercury and has not been easily recyclable when it is discarded, for example. In view of this, it has been proposed to use a light emitting diode (LED) that does not use mercury as the light source in a conventional backlight unit. Meanwhile, there has been a strong demand for the liquid crystal display unit, in particular, the liquid crystal display unit for use in mobile equipment as described above, to be smaller and thinner. As a measure to meet this demand, the light guide plate used in the conventional backlight unit has been made thinner, for example.

However, when the light emitting diode is made smaller, an amount of light emitted therefrom may be reduced significantly. Under the present circumstances, the light emitting diode can be made no smaller than about 300 μm square. Thus, in the conventional backlight unit, when the light guide plate is thinner than the size of the light emitting diode, light from the light emitting diode cannot be incident on the light guide plate sufficiently.

In view of the above, it has been proposed to provide the conventional backlight unit with a light guide block on an incident surface side of the light guide plate as described in JP 2000-249837A, for example. In this conventional backlight unit, it has been considered that light from the light emitting diode can be incident efficiently even on the light guide plate that is thinner than the size of the light emitting diode.

DISCLOSURE OF INVENTION

Problem to be Solved by the Invention

However, the conventional backlight unit as described above has a problem in that making the light guide plate thinner may cause a decrease in the light utilization efficiency of the light emitting diode (light source), making it difficult to achieve high brightness.

Figure 6A:
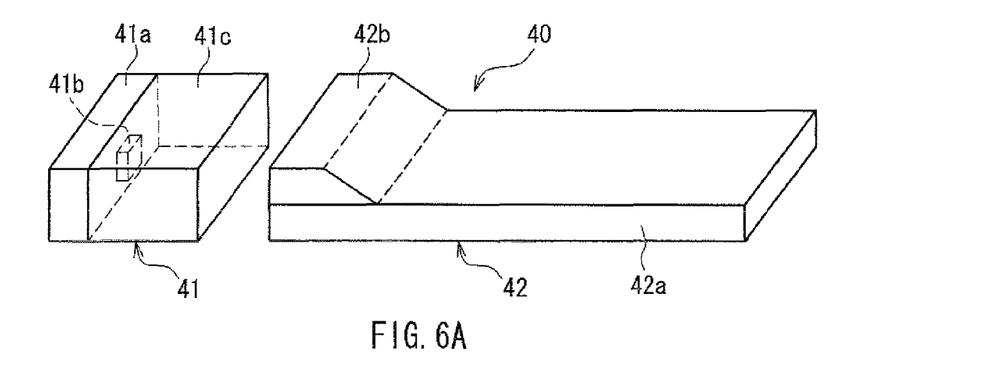
FIG. 6A illustrates a configuration of main portions of the conventional backlight unit.
Figure 6B:
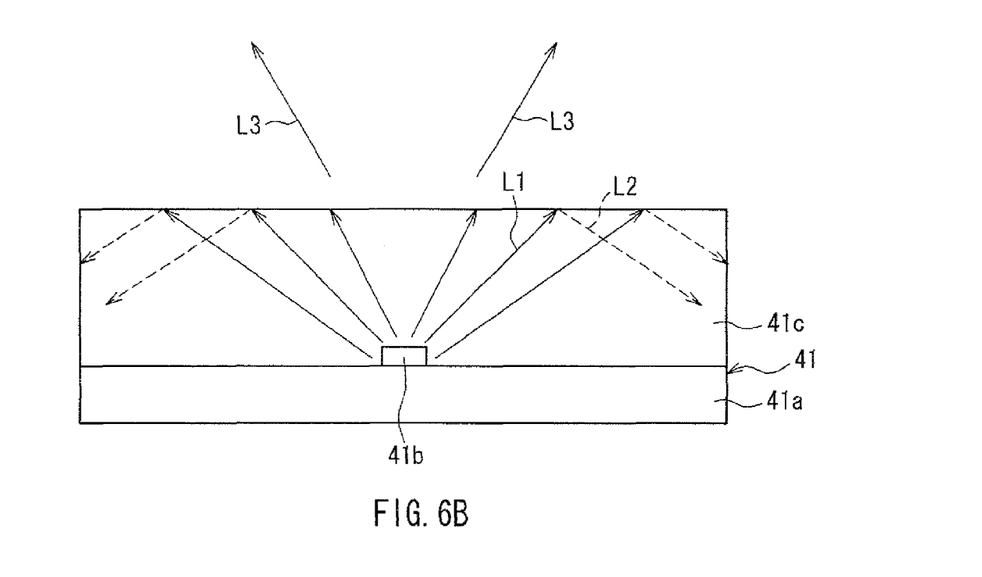
FIG. 6B illustrates a LED package used therein.

The following is a specific description of the above-described problem of the conventional backlight unit, with reference to FIGS. 6A and 6B.

FIGS. 6A and 6B are views for explaining the problem of the conventional backlight unit; FIG. 6A illustrates a configuration of main portions of the conventional backlight unit, and FIG. 6B illustrates a LED package used therein.

In FIG. 6A, a conventional backlight unit 40 includes a LED package 41, and a light guide plate 42 that receives light from the LED package 41 and outputs planar illumination light to the upper side of the figure, while guiding the light to the right side of the figure. The LED package 41 includes a substrate 41a, a light emitting diode chip (hereinafter, referred to as a "LED chip") 41b located at the center of the substrate 41a, and a sealing resin 41c that seals the LED chip 41b. The light guide plate 42 includes a flat light guide plate main body 42a, and a light guide block 42a adhered to the LED chip 41b side of the light guide plate main body 42a. In the conventional backlight unit 40, since the sealing resin 41c and the light guide block 42b are opposed to each other, it has been considered that light from the LED chip 41b can be incident efficiently even if the light guide plate (light guide plate main body 42a) 42 is thinner than the size of the LED package 41 in a thickness direction of the light guide plate 42.

However, in the conventional backlight unit 40, the light from the LED chip 41b sometimes is not output to the outside of the LED package 41 and thus not incident on the light guide plate 42. More specifically, since the LED package 41 is opposed to the light guide plate 42 with air interposed therebetween as shown in FIG. 6A, a part of light L1 from the LED chip 41b is totally reflected from an interface between the sealing resin 41c and the air, resulting in reflected light L2 that travels to an inner side of the sealing resin 41c as shown in FIG. 6B. As a result, an amount of light L3 output from the LED package 41 to the light guide plate 42 side becomes smaller than an amount of the light from the LED chip 41b, resulting in a decrease in light utilization efficiency. Thus, the backlight unit 40 sometimes cannot achieve higher brightness.

Additionally, in the conventional backlight unit 40, light sometimes leaks out from the inside of the light guide block 42b or from a portion where the light guide plate main body 42a and the light guide block 42b are adhered to each other, which may lead to a decrease in light utilization efficiency. Thus, along with the requirement to assemble the light guide plate main body 42a and the light guide block 42b accurately, it is sometimes difficult for the backlight unit 40 to achieve higher brightness.

It can be considered to manufacture the light guide plate by molding the light guide block and the light guide plate main body as described above integrally. However, when a member having a tapered surface like the light guide block is molded integrally with the flat light guide plate, the light guide plate is under stress that occurs due to the formation of the tapered surface. Thus, when the light guide plate (main body) is made thinner than about 200 μm, the light guide plate is subjected to deformation such as warping. In other words, in the conventional backlight unit 40, when the light guide plate main body 42a and the light guide block 42b are molded integrally so as to avoid light leakage from a portion where the light guide plate main body 42a and the light guide block 42b are adhered to each other, it is practically impossible to make the thickness dimension of the light guide plate main body 42a smaller than about 200 μm.

In view of the above-described problems, it is an object of the present invention to provide a backlight unit that can prevent a decrease in the light utilization efficiency of a light source and achieve higher brightness easily even when a light guide plate has a smaller thickness, and a display unit using the same.

Means for Solving Problem

In order to achieve the above-described object, a backlight unit according to the present invention is provided with a light source, and a light guide plate having an incident surface on which light from the light source is incident and guides the light incident on the incident surface in a predetermined light guide direction. The backlight unit includes a light-emitting portion that is provided on the light guide plate side of the light source so as to be opposed to the incident surface and outputs the light from the light source toward the light guide plate. A dimension on the incident surface side of the light-emitting portion in a thickness direction of the light guide plate is not more than a dimension at the incident surface of the light guide plate in its thickness direction, and the light-emitting portion uses a two-dimensional photonic crystal.

The backlight unit configured as described above includes the light-emitting portion that is provided on the light guide plate side of the light source so as to be opposed to the incident surface and outputs light from the light source toward the light guide plate. Further, a dimension on the incident surface side of the light-emitting portion in a thickness direction of the light guide plate is not more than a dimension at the incident surface of the light guide plate in its thickness direction, and the light-emitting portion uses a two-dimensional photonic crystal. Thus, unlike the above-described conventional example, the light from the light source can be output to the light guide plate side efficiently due to the diffraction effect of the two-dimensional photonic crystal regardless of the thickness dimension of the light guide plate. As a result, unlike the conventional example, it is possible to provide a backlight unit that can prevent a decrease in the light utilization efficiency of the light source and achieve higher brightness easily even when the light guide plate has a smaller thickness.

Further, the backlight unit preferably further includes: a light-passing portion that is provided between the light source and the light-emitting portion and allows the light from the light source to be incident on the light-emitting portion; and a light-reflecting portion that uses a one-dimensional or three-dimensional photonic crystal, is provided on an outer periphery of the light-passing portion, and reflects light to the inside of the light-passing portion.

In this case, the light-reflecting portion can prevent light leakage to the outside of the light-passing portion reliably due to the light reflecting function of the one-dimensional or three-dimensional photonic crystal, thereby preventing a decrease in the light utilization efficiency of the light source.

Further, in the backlight unit, the light-passing portion may have a tapered surface such that a dimension in the thickness direction of the light guide plate decreases gradually from the light source side to the light-emitting portion side.

In this case, even if the light source has a large dimension in the thickness direction of the light guide plate, the light-passing portion allows the light from the light source to be incident on the light-emitting portion reliably without causing any loss.

Further, in the backlight unit, in the two-dimensional photonic crystal, a plurality of teeth, each having an inclined structure in which an end on the light guide plate side is smaller than an end on the light source side, preferably are provided along a predetermined arrangement direction in a saw-tooth shape.

In this case, the light-emitting portion can increase the directivity of the light from the light source, so that the light can be output to the light guide plate side more efficiently.

Further, in the backlight unit, in the two-dimensional photonic crystal, the plurality of teeth may be provided symmetrically with respect to a center of the light source.

In this case, the inclined structure of each of the teeth is provided symmetrically with respect to the center of the light source, thereby increasing the directivity of light to be output to the light guide plate side.

Further, in the backlight unit, in the two-dimensional photonic crystal, a dimension at the end of each of the teeth on the light source side in the predetermined arrangement direction preferably is set within a dimension range of ⅓ to 5 times an emission wavelength of the light source.

In this case, it is possible to increase reliably the directivity and transmittance efficiency of light to be output from the light-emitting portion to the light guide plate side.

Further, in the backlight unit, in the two-dimensional photonic crystal, a height dimension of each of the teeth between the end on the light source side and the end on the light guide plate side preferably is set within a dimension range of ⅓ to 5 times an emission wavelength of the light source.

In this case, it is possible to increase reliably the directivity and transmittance efficiency of light to be output from the light-emitting portion to the light guide plate side.

Further, in the backlight unit, in the two-dimensional photonic crystal, each of the teeth may have a right triangle shape in cross section.

In this case, the two-dimensional photonic crystal in which each of the teeth has a right triangle shape in cross section increases the directivity and transmittance efficiency of light to be output from the light-emitting portion to the light guide plate side.

Further, in the backlight unit, in the two-dimensional photonic crystal, each of the teeth may have a trapezoidal shape in cross section.

In this case, the two-dimensional photonic crystal in which each of the teeth has a trapezoidal shape in cross section increases the directivity and transmittance efficiency of light to be output from the light-emitting portion to the light guide plate side.

Further, in the backlight unit, in the two-dimensional photonic crystal, each of the teeth may have a quadrangular pyramid shape.

In this case, the two-dimensional photonic crystal in which each of the teeth has a quadrangular pyramid shape increases the directivity and transmittance efficiency of light to be output from the light-emitting portion to the light guide plate side.

Further, in the backlight unit, the light guide plate preferably is formed of a flat plate having a rectangular cross section.

In this case, the light guide plate that has a small thickness dimension can be provided easily, so that the backlight unit can be made thinner easily.

Further, in the backlight unit, the light source is preferably a light emitting diode.

In this case, the light source that has a longer life and is compact can be provided easily, and thus the backlight unit that has high performance and is smaller can be obtained easily.

Further, a display unit according to the present invention is provided with a display portion. The display portion is irradiated with light from any one of the above-described backlight units.

In the display unit configured as described above, the display portion is irradiated with light from the backlight unit that can prevent a decrease in the light utilization efficiency of the light source and achieve higher brightness easily even when the light guide plate has a smaller thickness. Thus, the display unit that is compact and has high performance can be obtained easily.

Effects of the Invention

According to the present invention, it is possible to provide a backlight unit that can prevent a decrease in the light utilization efficiency of a light source and achieve higher brightness easily even when a light guide plate has a smaller thickness, and a display unit using the same.

BRIEF DESCRIPTION OF DRAWINGS

FIGS. 2A to 2C are views illustrating a configuration of main portions of the backlight unit.

FIGS. 4A to 4C are views illustrating a configuration of main portions of a backlight unit according to a second embodiment of the present invention.

FIGS. 6A and 6B are views for explaining a problem of a conventional backlight unit.

DESCRIPTION OF THE INVENTION

Hereinafter, preferred embodiments of a backlight unit and a display unit using the same according to the present invention will be described with reference to the drawings. It should be noted that the following description is directed to the case where the present invention is applied to a transmission-type liquid crystal display unit by way of example. Further, the size and size ratio of the constituent members in each figure do not exactly reflect those of actual constituent members.

[First Embodiment]

Figure 1:
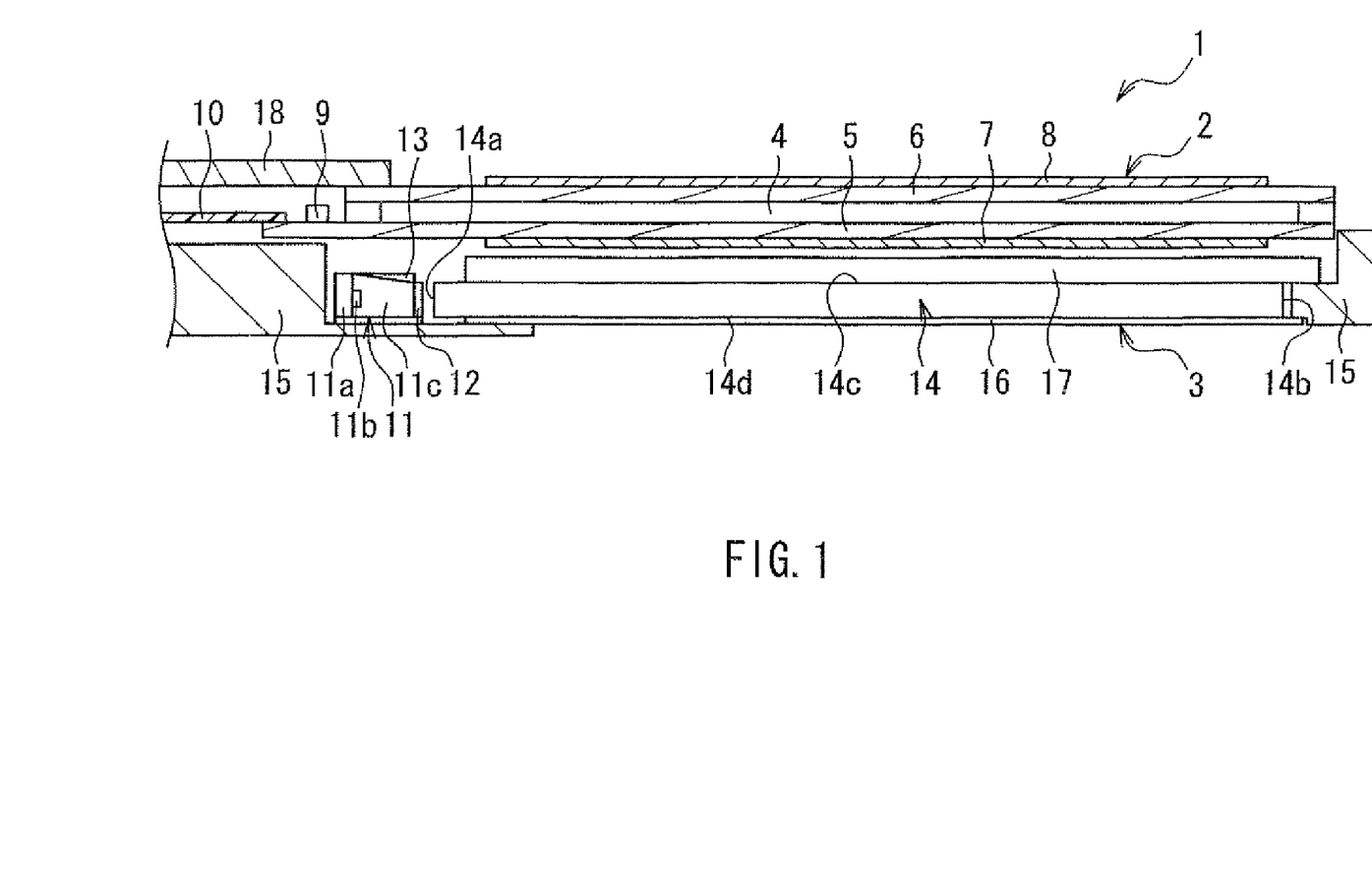
FIG. 1 is a schematic cross-sectional view illustrating a backlight unit and a liquid crystal display unit according to a first embodiment of the present invention.

FIG. 1 is a schematic cross-sectional view illustrating a backlight unit and a liquid crystal display unit according to a first embodiment of the present invention. In the figure, a liquid crystal display unit 1 of the present embodiment includes a liquid crystal panel 2 as a display portion that is located with the upper side of the figure defined as a viewing side (display surface side), and a backlight unit 3 of the present invention that is disposed on a non-display surface side (lower side of the figure) of the liquid crystal panel 2 and generates illumination light to irradiate the liquid crystal panel 2 therewith.

The liquid crystal panel 2 includes a liquid crystal layer 4, a pair of transparent substrates 5 and 6 between which the liquid crystal layer 4 is sandwiched, and polarizing plates 7 and 8 provided respectively on outer surfaces of the transparent substrates 5 and 6. Further, the liquid crystal panel 2 includes a driver 9 connected to a flexible printed board 10, so that the liquid crystal layer 4 can be driven on a pixel basis. In the liquid crystal panel 2, a polarization state of the illumination light incident through the polarizing plate 7 is modulated by the liquid crystal layer 4, and an amount of light passing through the polarizing plate 8 is controlled, whereby a desired image is displayed on a display surface.

The backlight unit 3 includes a LED package 11 as a light source, a light-emitting portion 12 provided on a below-described light guide plate side of the LED package 11, a light-reflecting portion 13 located on the upper side of the LED package 11, and a light guide plate 14 that receives light from the LED package 11 through the light-emitting portion 12 and guides the light in a predetermined light guide direction (horizontal direction in FIG. 1). The LED package 11, the light-emitting portion 12, and the light-reflecting portion 13 are assembled integrally as described in detail below. The light guide plate 14 is made of a synthetic resin such as a transparent acrylic resin.

Further, the light guide plate 14 is formed of a flat plate that has a constant dimension in its thickness direction (vertical direction in FIG. 1) and has a rectangular cross section. More specifically, the light guide plate 14 includes an incident surface 14a on which light from the LED package 11 is incident, an opposed surface 14b provided in parallel with the incident surface 14a, and a light-emitting surface 14c and a non-light-emitting surface 14d that are provided orthogonally to the incident surface 14a and the opposed surface 14b and in parallel with each other. The light guide plate 14 outputs light appropriately from the light-emitting surface 14c toward the liquid crystal panel 2, while guiding incident light from the LED package 11 in the predetermined light guide direction.

As described above, since the light guide plate 14 is formed of a flat plate having a rectangular cross section, the light guide plate 14 that has a small thickness dimension can be provided easily, so that the backlight unit 3 can be made thinner easily. It should be noted, however, that the light guide plate 14 of the present embodiment is not limited thereto, and it is also possible to use a light guide plate having a wedge-shaped cross section, for example.

Further, the dimension at the incident surface 14a of the light guide plate 14 in its thickness direction is the same as that of the light-emitting portion 12 in the thickness direction, so that light from the LED package 11 can be incident on the light guide plate 14 through the light-emitting portion 12 efficiently (as described in detail below).

In the backlight unit 3, a reflecting sheet 16 is located in contact with the non-light-emitting surface 14d of the light guide plate 14. On the liquid crystal panel 2 side (light-emitting surface 14c side) of the light guide plate 14, an optical sheet 17 such as a lens sheet and a diffusion sheet is provided, so that light from the LED package 11 that has been guided through the light guide plate 14 in the predetermined light guide direction is converted into the above-described planar illumination light having uniform brightness, which then is supplied to the liquid crystal panel 2.

Further, in the backlight unit 3, the LED package 11, the light-emitting portion 12, the light-reflecting portion 13, the light guide plate 14, the reflecting sheet 16, and the optical sheet 17 are held tight by a bezel 15 having a L-shaped cross section in a state where the liquid crystal panel 2 is located above the light guide plate 14. Further, a case 18 is mounted on the transparent substrate 6 so as to cover the driver 9 and the flexible printed board 10. Accordingly, the backlight unit 3 and the liquid crystal panel 2 are assembled with each other and integrated into the transmission-type liquid crystal display unit 1 in which illumination light from the backlight unit 3 is incident on the liquid crystal panel 2.

Hereinafter, the LED package 11, the light-emitting portion 12, and the light-reflecting portion 13 will be described specifically also with reference to FIGS. 2A to 2C.

Figure 2A:
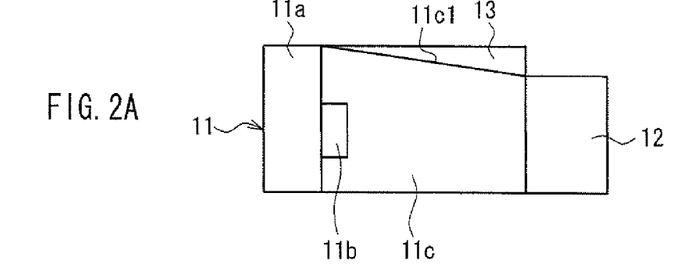
FIG. 2A is a side view of a LED package, a light-emitting portion, and a light-reflecting portion shown in FIG. 1.
Figure 2B:
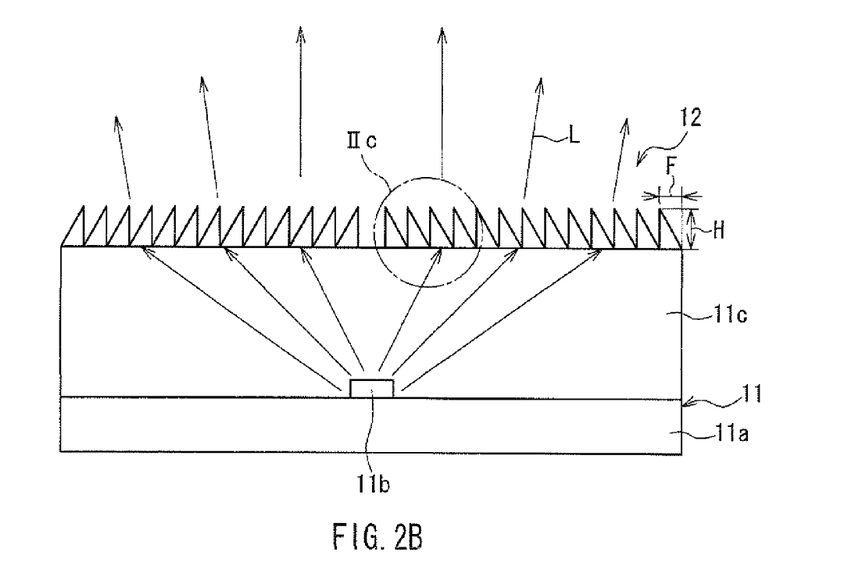
FIG. 2B is a plan view of the LED package and the light-emitting portion.
Figure 2C:
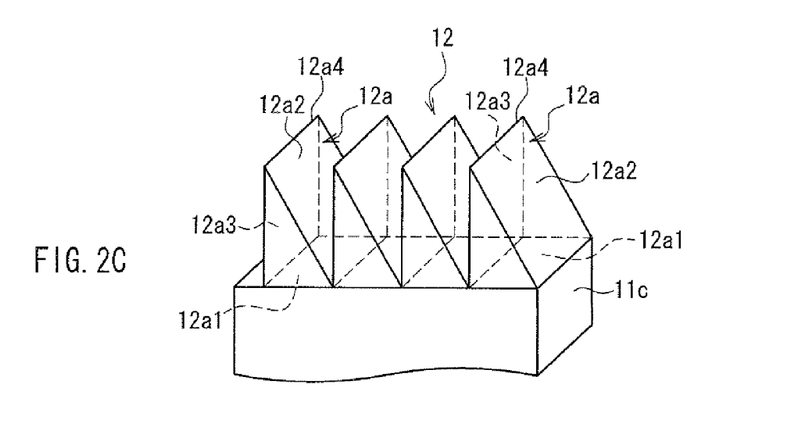
FIG. 2C is a partially enlarged perspective view of a circled part IIc of the light-emitting portion shown in FIG. 2B.

FIGS. 2A to 2C are views illustrating a configuration of the main portions of the backlight unit. FIG. 2A is a side view of the LED package, the light-emitting portion, and the light-reflecting portion shown in FIG. 1. FIG. 2B is a plan view of the LED package and the light-emitting portion. FIG. 2C is a partially enlarged perspective view of a circled part IIc of the light-emitting portion shown in FIG. 2B.

As shown in FIG. 2A, the LED package 11 includes a substrate 11a, a light emitting diode chip (hereinafter, referred to as a "LED chip") 11b located at the center of the substrate 11a, and a sealing resin 11c that is provided so as to cover the LED chip 11b to seal the same. The LED chip 11b is formed of a blue light emitting diode that emits blue light having a center wavelength of 450 nm, for example. The sealing resin 11c contains a yellow phosphor or green and red phosphors. Accordingly, the LED package 11 outputs white light based on the blue light from the LED chip 11b and the phosphor in the sealing resin 11c.

The sealing resin 11c is provide between the LED chip 11b as a practical light source and the light-emitting portion 12, and forms a light-passing portion that allows light from the LED chip 11b to be incident on the light-emitting portion 12. On the light guide plate 14 side of the sealing resin 11c, the light-emitting portion 12 is assembled integrally. As described above, the dimension on the incident surface 14a side of the light-emitting portion 12 in the thickness direction of the light guide plate 14 is the same as that at the incident surface 14a of the light guide plate 14 in its thickness direction. Thus, as shown in FIG. 2A, the sealing resin 11c has a tapered surface 11c1 such that the dimension in the thickness direction of the light guide plate 14 decreases gradually from the LED chip 11b side to the light-emitting portion 12 side. Thus, even if the LED chip (light source) 11b used in the backlight unit 3 of the present embodiment has a large dimension in the thickness direction of the light guide plate 14, the sealing resin (light-passing portion) 11c allows light from the LED chip 11b to be incident on the light-emitting portion 12 reliably without causing any loss.

More specifically, even if the LED chip 11b has a size of 300μ square, for example, and a longitudinal or lateral dimension larger than 100 μm, which is the dimension of the light guide plate 14 in its thickness direction, the tapered surface 11c1 provided appropriately allows light from the LED chip 11b to be incident on the light-emitting portion 12 reliably.

On the upper side of the tapered surface 11c1, the light-reflecting portion 13 using a one-dimensional or three-dimensional photonic crystal is assembled integrally, so that light to be output from the tapered surface 11c1 to the outside is totally reflected to the inside of the tapered surface 11c1. The one-dimensional or three-dimensional photonic crystal is formed of a plurality of types of optical multilayer films (such as a synthetic resin and platinum) having refractive indexes different from one another.

In the light-reflecting portion 13 using a one-dimensional photonic crystal, each of the optical multilayer films is formed to have a different thickness in the depth direction (vertical direction in FIG. 2A). This allows more light to satisfy the Bragg's condition of diffraction, so that light having various energy (wavelengths) can be reflected.

On the other hand, in the light-reflecting portion 13 using a three-dimensional photonic crystal, the optical multilayer films are formed by thermal nanoimprint in which a mold (die) having a rectangular structure, for example, is rotated 90 degrees alternately. This also allows light having various energy (wavelengths) to be reflected by Bragg reflection as in the case of using the one-dimensional photonic crystal.

As described above, in the backlight unit 3 of the present embodiment, since the light-reflecting portion 13 using the one-dimensional or three dimensional photonic crystal is provided on the upper side of the tapered surface 11c1, it is possible to prevent light leakage to the outside of the tapered surface (light-passing portion) 11c1 reliably due to the light reflecting function of the one-dimensional or three-dimensional photonic crystal, thereby preventing a decrease in the light utilization efficiency of the LED chip (light source) 11b.

Besides the above description, the light-reflecting portion using the one-dimensional or three-dimensional photonic crystal may be provided on an entire outer periphery (entire outer peripheral surface) of the sealing resin 11c, for example.

The light-emitting portion 12 uses a two-dimensional photonic crystal. Due to the diffraction effect of the two-dimensional photonic crystal, light to be output to the light guide plate 14 side is focused, and the focused light with increased directivity is incident on the incident surface 14a of the light guide plate 14. More specifically, as shown in FIGS. 2B and 2C, in the light-emitting portion 12, a plurality of teeth 12a of a two-dimensional photonic crystal that diffracts light are disposed on a surface of the sealing rein 11c on the incident surface 14a side along a predetermined arrangement direction in a saw-tooth shape (blazed shape) by using UV nanoimprint, for example.

Each of the teeth 12a has a right triangle shape in cross section. More specifically, as shown in FIG. 2C, the tooth 12a includes a rectangular bottom surface 12a1 that is bonded to the sealing resin 11c, an inclined surface 12a2 that is formed at a predetermined inclination angle with respect to the bottom surface 12a1, a vertical surface 12a3 that is vertical to the bottom surface 12a1, and a boundary line 12a4 an edge line of the right triangle) between the inclined surface 12a2 and the vertical surface 12a3. Further, as shown in FIG. 2B, the plurality of teeth 12a in the light-emitting portion 12 are provided symmetrically in the horizontal direction in FIG. 2B with respect to the center of the LED chip 11b.

More specifically, in the light-emitting portion 12, each of the teeth 12a on the left side of the center of the LED chip 11b is provided with its inclined surface 12a2 directed to the left side (side opposite to the center of the LED chip 11b). On the other hand, each of the teeth 12a on the right side of the center of the LED chip 11b is provided with its inclined surface 12a2 directed to the right side (side opposite to the center of the LED chip 11b). In this manner, the plurality of teeth 12a are provided with their inclined surfaces 12a2 symmetrical with respect to the center of the LED chip 11b. Thus, it becomes possible to make effective use of a high diffraction efficiency of the saw-tooth shaped two-dimensional photonic crystal with respect to a certain order of diffracted light, thereby increasing the directivity and transmittance efficiency of light to be output to the light guide plate 14 side.

In each of the teeth 12a, the bottom surface 12a1 forms an end on the light source side, while the boundary line 12a4 forms an end on the light guide plate side. The dimension (represented by "F" in FIG. 2B; this corresponds to the lattice constant of the periodic structure of the saw-tooth shaped teeth 12a) of the bottom surface 12a1 of each of the teeth 12a in the predetermined arrangement direction is set within a dimension range of ⅓ to 5 times an emission wavelength (center wavelength) of the LED chip 11b. In other words, in the light-emitting portion 12, a value in the above-described dimension range is selected for the structural period of the teeth 12a in the horizontal direction (arrangement direction) in FIG. 2B. Thus, in the backlight unit 3 of the present embodiment, it is possible to increase reliably the directivity and transmittance efficiency of light to be output from the light-emitting portion 12 to the light guide plate 14 side.

If the dimension F of each of the teeth 12a is smaller than ⅓ the emission wavelength of the LED chip 11b, the diffraction efficiency of the two-dimensional photonic crystal decreases, so that light may not be output to the light guide plate 14 side depending on the angle at which light is incident on the teeth 12a. On the other hand, if the dimension F is larger than 5 times the emission wavelength, the diffraction effect of the two-dimensional photonic crystal does not work, resulting in a decrease in the directivity and transmittance efficiency of light to be output to the light guide plate 14 side.

Further, the height dimension (represented by "H" in FIG. 2B), i.e., the dimension between the bottom surface 12a1 and the boundary line 12a4, of each of the teeth 12a is set within a dimension range of ⅓ to 5 times the emission wavelength (center wavelength) of the LED chip 11b. Thus, in the backlight unit 3 of the present embodiment, it is possible to increase reliably the directivity and transmittance efficiency of light to be output from the light-emitting portion 12 to the light guide plate 14 side.

If the height dimension H of each of the teeth 12a is smaller than ⅓ the emission wavelength of the LED chip 11b, the diffraction efficiency of the two-dimensional photonic crystal decreases, so that light may not be output to the light guide plate 14 side depending on the angle at which light is incident on the teeth 12a. On the other hand, if the height dimension H is larger than 5 times the emission wavelength, the diffraction effect of the two-dimensional photonic crystal does not work, resulting in a decrease in the directivity and transmittance efficiency of light to be output to the light guide plate 14 side.

In the light-emitting portion 12 configured as described above, the teeth 12a formed of the two-dimensional photonic crystal allows light from the LED chip 11b to be output to the light guide plate 14 side reliably as indicated by arrows in FIG. 2B. In the conventional example shown in FIG. 6, light incident on the interface between the sealing resin and the air at an angle larger than a critical angle is not output.

On the other hand, in the light-emitting portion 12, even if light is incident on an interface between the sealing resin 11c and the bottom surface 12a1 of each of the teeth 12a at an angle larger than a critical angle, the light is output to the light guide plate 14 side reliably due to the diffraction effect of the two-dimensional photonic crystal. In addition, since the plurality of teeth 12a, each having a right triangle shape in cross section and having the inclined structure with the inclined surface 12a2 as described above, are provided, light in a direction closer to a direction normal to an emission surface (i.e., a surface of the sealing resin 11c opposed to the incident surface 14a) of the LED package 11 can be output from the entire emission surface to the light guide plate 14 side uniformly.

Hereinafter, the results of a verification test conducted by the present inventors will be described specifically with reference to FIG. 3.

Figure 3:
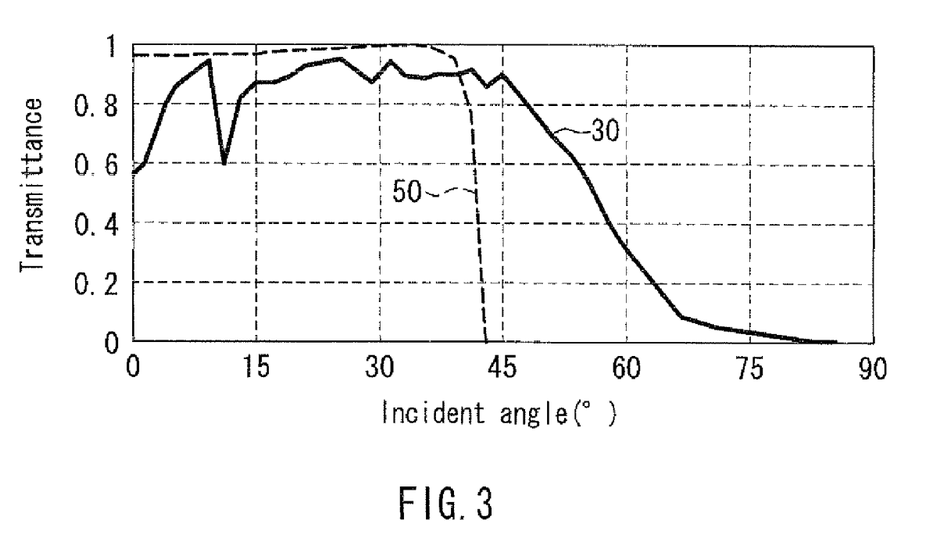
FIG. 3 is a graph showing an effect of the light-emitting portion.

FIG. 3 is a graph showing the effect of the light-emitting portion.

This verification test used a product of the present embodiment in which the light-emitting portion 12 of the two-dimensional photonic crystal in which the plurality of teeth 12a were provided such that the dimension F and the height dimension H were both 1 μm was formed on the sealing resin 11c that covered the blue LED chip 11b having a center wavelength of 450 nm. This product was compared with a comparative product in which the light-emitting portion 12 was not formed. As a result, in the product of the present embodiment, light incident at a wider range of angles is output as indicated by a solid line 30 in FIG. 3 than in the comparative product (indicated by a broken line 50 in FIG. 3). More specifically, it was confirmed that the product of the present embodiment allowed light to be output from the sealing resin 11c to the light guide plate 14 side in an amount 1.2 times that in the comparative product, achieving an improvement in light emission ratio (light extraction efficiency).

Further, it was confirmed with respect to the product of the present embodiment that light was output at an angle smaller than an angle at which the light was incident on the light-emitting portion 12 in such a manner, for example, that light incident at an angle of 30° was output at an angle of 17.5°, or alternatively, light incident at an angle of 60° was output at an angle of 23.5°. As described above, light was output at an angle smaller than the incident angle in the product of the present embodiment. Thus, it was verified that light with no brightness unevenness was output and incident on the light guide plate 14 efficiently.

Besides the above description, for example, the teeth 12a may be formed such that all the inclined surfaces 12a2 are directed to the LED chip 11b side, i.e., the inclined surfaces 12a2 of the teeth 12a on the right and left sides of the LED chip 11b are opposed to each other in FIG. 2B.

The backlight unit 3 of the present embodiment configured as described above includes the light-emitting portion 12 that is provided on the light guide plate 14 side of the LED package (light source) so as to be opposed to the incident surface 14a and outputs light from the LED package 11 toward the light guide plate 14. Further, the dimension on the incident surface 14a side of the light-emitting portion 12 in the thickness direction of the light guide plate 14 is the same as that at the incident surface 14a of the light guide plate 14 in its thickness direction. Further, the light-emitting portion 12 uses the two-dimensional photonic crystal. Due to the diffraction effect of the two-dimensional photonic crystal, light to be output to the light guide plate 14 side is focused, and the focused light with increased directivity is incident on the incident surface 14a of the light guide plate 14. Thus, unlike the above-described conventional example, the backlight unit 3 of the present embodiment allows light from the LED package 11 to be output to the light guide plate 14 side efficiently due to the diffraction effect of the two-dimensional photonic crystal regardless of the thickness dimension of the light guide plate 14. As a result, unlike the conventional example, even when the light guide plate 14 has a smaller thickness, the backlight unit 3 of the present embodiment can prevent a decrease in the light utilization efficiency of the LED package 11 and achieve higher brightness easily.

Further, in the liquid crystal display unit 1 of the present embodiment, the liquid crystal panel (display portion) 2 is irradiated with light from the backlight unit 3 that can prevent a decrease in the light utilization efficiency of the LED package (light source) 11 and achieve higher brightness easily even when the light guide plate 14 has a smaller thickness. Thus, the liquid crystal display unit 1 that is compact and has high performance can be obtained easily.

[Second Embodiment]

Figure 4A:
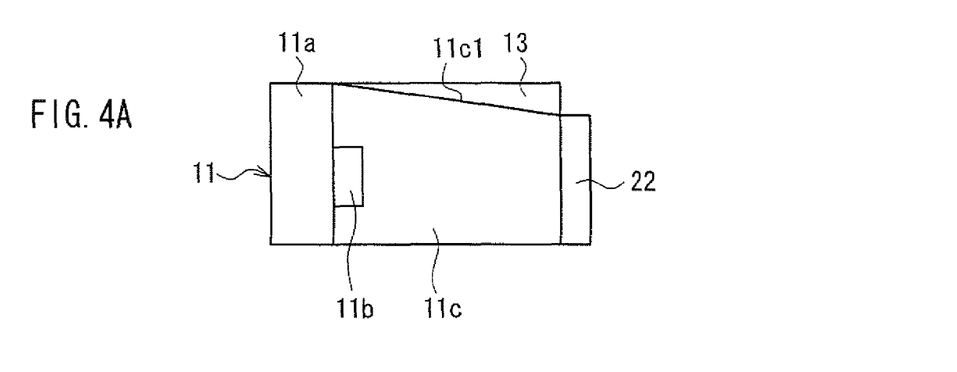
FIG. 4A is a side view of a LED package, a light-emitting portion, and a light-reflecting portion of the present embodiment.
Figure 4B:
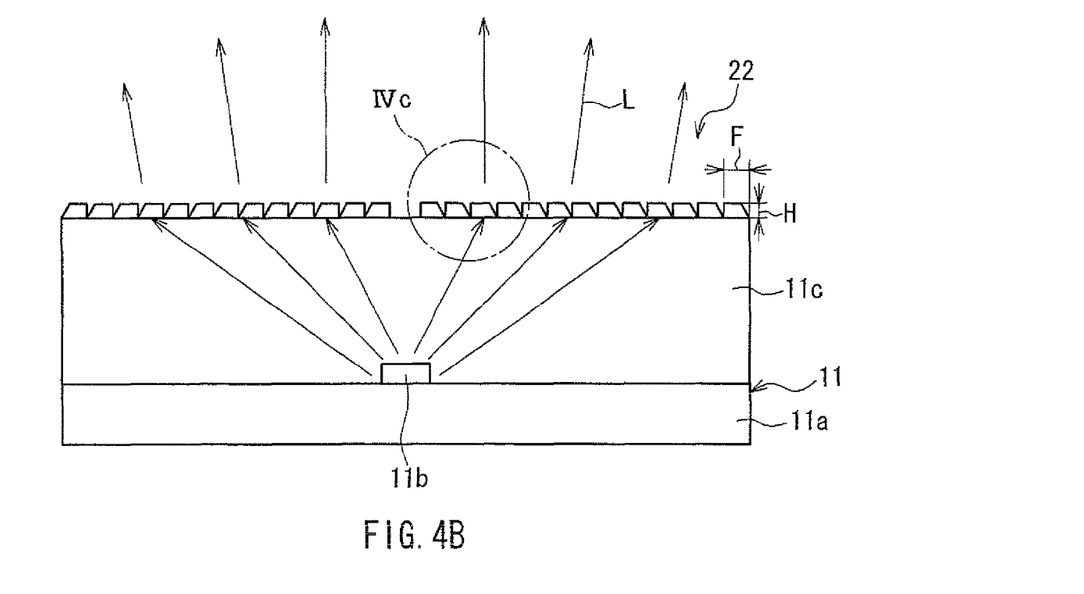
FIG. 4B is a plan view of the LED package and the light-emitting portion of the present embodiment.
Figure 4C:
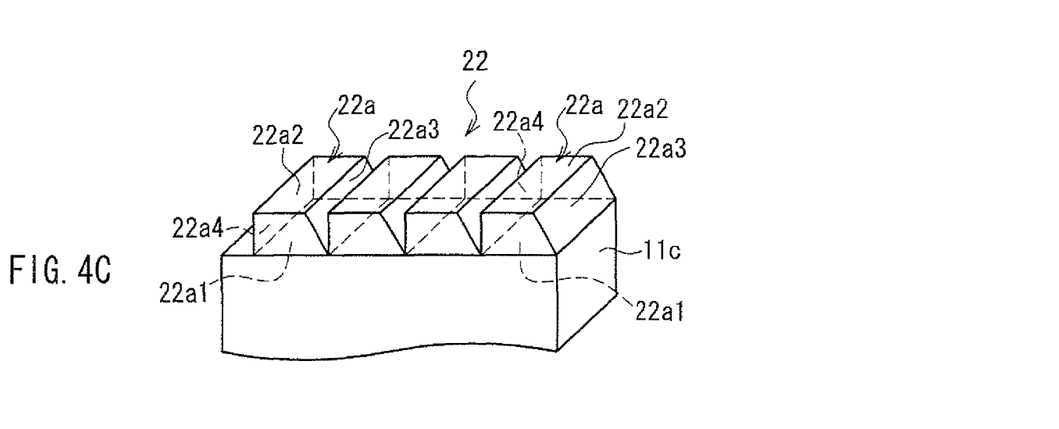
FIG. 4C is a partially enlarged perspective view of a circled part IVc of the light-emitting portion shown in FIG. 4B.

FIGS. 4A to 4C are views illustrating a configuration of main portions of a backlight unit according to a second embodiment of the present invention. FIG. 4A is a side view of a LED package, a light-emitting portion, and a light-reflecting portion of the present embodiment. FIG. 4B is a plan view of the LED package and the light-emitting portion of the present embodiment. FIG. 4C is a partially enlarged perspective view of a circled part IVc of the light-emitting portion shown in FIG. 4B. In the figures, the present embodiment is different from the first embodiment mainly in that the light-emitting portion uses a two-dimensional photonic crystal in which each tooth has a trapezoidal shape in cross section. The same elements as those in the first embodiment are denoted with the same reference numerals, and repeated descriptions thereof are omitted.

As shown in FIG. 4A, in the backlight unit 3 of the present embodiment, a light-emitting portion 22 is assembled integrally with the sealing resin 11c of the LED package 11. The light-emitting portion 22 uses a two-dimensional photonic crystal as in the first embodiment, and includes a plurality of teeth 22a disposed along a predetermined arrangement direction in a saw-tooth shape as shown in FIG. 4B.

More specifically, as shown in FIG. 4C, each of the teeth 22a has a trapezoidal shape in cross section, and the light-emitting portion 22 of the present embodiment is configured to increase the directivity and transmittance efficiency of light to be output to the light guide plate 14 side as in the first embodiment. Specifically, the tooth 22a includes a rectangular bottom surface 22a1 that is bonded to the sealing resin 11c, an upper surface 22a2 that is provided in parallel with the bottom surface 22a1, and inclined surfaces 22a3 and 22a4 that are formed at respective predetermined inclination angles with respect to the bottom surface 22a1 between the bottom surface 22a1 and the upper surface 22a2. As shown in FIG. 4C, the inclined surface 22a3 is formed at a smaller inclination angle with respect to the bottom surface 22a1 than the inclined surface 22a4.

Further, the plurality of teeth 22a in the light-emitting portion 22 are provided symmetrically in the horizontal direction in FIG. 4B with respect to the center of the LED chip 11b as in the first embodiment. More specifically, in the light-emitting portion 22, each of the teeth 22a on the left side of the center of the LED chip 11b is provided with its inclined surface 22a3 directed to the left side (side opposite to the center of the LED chip 11b), for example. On the other hand, each of the teeth 22a on the right side of the center of the LED chip 11b is provided with its inclined surface 22a3 directed to the right side (side opposite to the center of the LED chip 11b).

In each of the teeth 22a, the bottom surface 22a1 forms an end on the light source side, while the upper surface 22a2 forms an end on the light guide plate side. As in the first embodiment, the dimension (represented by "F" in FIG. 4B) of the bottom surface 22a1 of each of the teeth 22a in the predetermined arrangement direction is set within a dimension range of ⅓ to 5 times the emission wavelength (center wavelength) of the LED chip 11b.

Further, as in the first embodiment, the height dimension (represented by "H" in FIG. 4B), i.e., the dimension between the bottom surface 22a1 and the upper surface 22a2, of each of the teeth 22a is set within a dimension range of ⅓ to 5 times the emission wavelength (center wavelength) of the LED chip 11b.

With the above-described configuration, the same effect as in the first embodiment can be achieved in the present embodiment.

[Third Embodiment]

Figure 5:
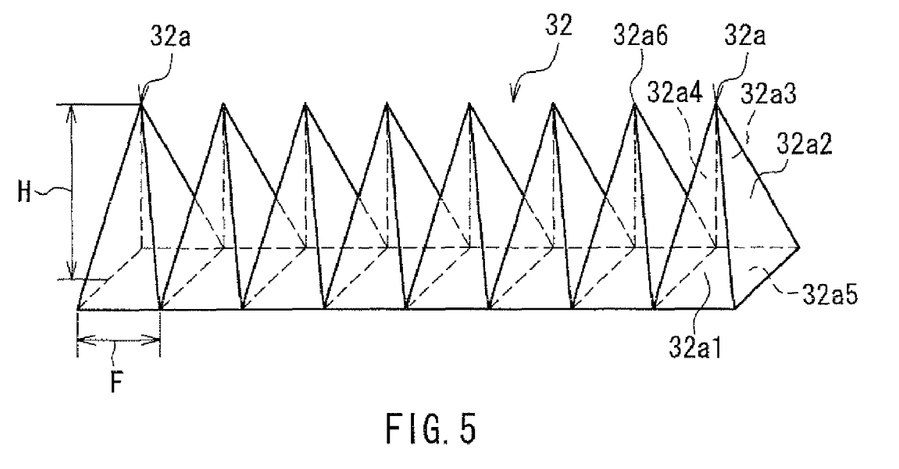
FIG. 5 is an enlarged perspective view showing a configuration of a light-emitting portion of a backlight unit according to a third embodiment of the present invention.

FIG. 5 is an enlarged perspective view showing a configuration of a light-emitting portion of a backlight unit according to a third embodiment of the present invention. In the figure, the present embodiment is different from the first embodiment mainly in that the light-emitting portion uses a two-dimensional photonic crystal in which each tooth has a quadrangular pyramid shape. The same elements as those in the first embodiment are denoted with the same reference numerals, and repeated descriptions thereof are omitted.

As shown in FIG. 5, in the backlight unit 3 of the present embodiment, a light-emitting portion 32 uses a two-dimensional photonic crystal as in the first embodiment, and includes a plurality of teeth 32a disposed along a predetermined arrangement direction in a saw-tooth shape. Further, as shown in FIG. 5, each of the teeth 32a has a quadrangular pyramid shape, and the light-emitting portion 32 of the present embodiment is configured to increase the directivity and transmittance efficiency of light to be output to the light guide plate 14 side as in the first embodiment.

More specifically, the tooth 32a includes four inclined surfaces 32a1, 32a2, 32a3, and 32a4, and a rectangular bottom surface 32a5 that is bonded to the sealing resin 11c. The inclined surfaces 32a1 to 32a4 are formed at predetermined inclination angles with respect to the bottom surface 32a5.

In each of the teeth 32a, the bottom surface 32a5 forms an end on the light source side, while a vertex 32a6 of the quadrangular pyramid forms an end on the light guide plate side. As in the first embodiment, the dimension (represented by "F" in FIG. 5) of the bottom surface 32a5 of each of the teeth 32a in the predetermined arrangement direction is set within a dimension range of ⅓ to 5 times the emission wavelength (center wavelength) of the LED chip 11b.

Further, as in the first embodiment, the height dimension (represented by "H" in FIG. 5), i.e., the dimension between the bottom surface 32a5 and the vertex 32a6, of each of the teeth 32a is set within a dimension range of ⅓ to 5 times the emission wavelength (center wavelength) of the LED chip 11b.

With the above-described configuration, the same effect as in the first embodiment can be achieved in the present embodiment.

It should be noted that the above embodiments are all illustrative and not restrictive. The technological scope of the present invention is defined by the appended claims, and all changes that come within the range of equivalency of the claims are intended to be embraced therein.

For example, although the above description explains the cases where the present invention is applied to the transmission-type liquid crystal display unit, the backlight unit of the present invention is not limited thereto. The backlight unit of the present invention can be applied to various types of display units each of which has a non-light-emitting type display portion for displaying information such as images and characters by utilizing light from a light emitting diode. More specifically, the backlight unit of the present invention can suitably be used in a semi-transmission type liquid crystal display unit, or to a projection-type display unit in which a liquid crystal panel is used as a light bulb.

Further, the above description explains the cases where the light-emitting portion uses a two-dimensional photonic crystal in which each of the teeth has a right triangle shape or a trapezoidal shape in cross section or has a quadrangular pyramid shape. However, the configuration of the teeth in terms of their shape, number, and the like is not limited thereto, as long as the dimension on the incident surface side of the light-emitting portion of the present invention in the thickness direction of the light guide plate is not more than the dimension at the incident surface of the light guide plate in its thickness direction, and the light-emitting portion uses a two-dimensional photonic crystal.

However, it is preferable that the plurality of teeth, each having the inclined structure in which the end on the light guide plate side is smaller than the end on the light source side, are disposed in a predetermined arrangement direction in a saw-tooth shape in the two-dimensional photonic crystal as in the above-described embodiments, because this allows the light-emitting portion to increase the directivity of light from the light source, so that the light can be output to the light guide plate side more efficiently.

Further, although the above description explains the cases where the light emitting diode is used as the light source, the light source of the present invention is not limited thereto. Another light emitting element such as an organic EL (Electronic Luminescence), another point light source such as a PDP (Plasma Display Panel), a lamp, a discharge tube, or the like also can be used.

However, it is preferable to use the light emitting diode as the light source as in the above-described embodiment, because this allows the light source to have a longer life and be compact easily, so that the backlight unit that has high performance and is smaller can be obtained easily.

Further, the above description explains the cases where the so-called pseudo-white light emitting diode that includes the blue light emitting diode chip and the sealing resin containing a yellow phosphor or green and red phosphors is used. However, the light emitting diode of the present invention is not limited thereto. More specifically, it is also possible to use a light emitting diode that emits monochromatic light, i.e., color light corresponding to any one of RGB, and the lattice constant (i.e., the dimension F in the arrangement direction), the height dimension H, and the like of the structural period of the teeth in the light-emitting portion may be varied appropriately depending on the emission wavelength of the light emitting diode.

Further, although the above description explains the cases where the sealing resin is used as the light-passing portion, the light-passing portion of the present invention is not limited thereto. More specifically, for example, a gap formed in a tubular light-reflecting portion using a one-dimensional or three-dimensional photonic crystal can be used as the light-passing portion.

INDUSTRIAL APPLICABILITY

The present invention is useful for a backlight unit that can prevent a decrease in the light utilization efficiency of a light source and achieve higher brightness easily even when a light guide plate has a smaller thickness, and a compact and high-performance display unit using the same.

The invention claimed is:

1. A backlight unit including a light source, and a light guide plate having an incident surface on which light from the light source is incident and guides the light incident on the incident surface in a predetermined light guide direction, the backlight unit comprising:
   a light-emitting portion that is provided on the light guide plate side of the light source so as to be opposed to the incident surface and outputs the light from the light source toward the light guide plate,
   wherein a dimension on the incident surface side of the light-emitting portion in a thickness direction of the light guide plate is not more than a dimension at the incident surface of the light guide plate in its thickness direction,
   the light-emitting portion comprises a two-dimensional photonic crystal,
   a light-passing portion that is provided between the light source and the light-emitting portion and allows the light from the light source to be incident on the light-emitting portion; and
   a light-reflecting portion that comprises a one-dimensional or three-dimensional photonic crystal, is provided on an outer periphery of the light-passing portion, and reflects light to the inside of the light-passing portion.

2. The backlight unit according to claim 1, wherein the light-passing portion has a tapered surface such that a dimension in the thickness direction of the light guide plate decreases gradually from the light source side to the light-emitting portion side.

3. The backlight unit according to claim 1, wherein in the two-dimensional photonic crystal, a plurality of teeth, each having an inclined structure in which an end on the light guide plate side is smaller than an end on the light source side, are provided along a predetermined arrangement direction in a saw-tooth shape.

4. The backlight unit according to claim 3, wherein in the two-dimensional photonic crystal, the plurality of teeth are provided symmetrically with respect to a center of the light source.

5. The backlight unit according to claim 3, wherein in the two-dimensional photonic crystal, a dimension at the end of each of the teeth on the light source side in the predetermined arrangement direction is set within a dimension range of ⅓ to 5 times an emission wavelength of the light source.

6. The backlight unit according to claim 3, wherein in the two-dimensional photonic crystal, a height dimension of each of the teeth between the end on the light source side and the end on the light guide plate side is set within a dimension range of ⅓ to 5 times an emission wavelength of the light source.

7. The backlight unit according to claim 3, wherein in the two-dimensional photonic crystal, each of the teeth has a right triangle shape in cross section.

8. The backlight unit according to claim 3, wherein in the two-dimensional photonic crystal, each of the teeth has a trapezoidal shape in cross section.

9. The backlight unit according to claim 3, wherein in the two-dimensional photonic crystal, each of the teeth has a quadrangular pyramid shape.

10. The backlight unit according to claim 1, wherein the light guide plate is formed of a flat plate having a rectangular cross section.

11. The backlight unit according to claim 1, wherein the light source is a light emitting diode.

12. A display unit provided with a display portion,
    wherein the display portion is irradiated with light from the backlight unit according to claim 1.

* * * * *